US 008373117B2

(12) United States Patent
Badiei et al.

(10) Patent No.: US 8,373,117 B2
(45) Date of Patent: Feb. 12, 2013

(54) GAS DELIVERY SYSTEM FOR MASS SPECTROMETER REACTION AND COLLISION CELLS

(75) Inventors: Hamid R. Badiei, Vaughan (CA); Kaveh Kahen, Maple (CA)

(73) Assignee: DH Technologies Development PTE. Ltd., Singapore (SG)

(\*) Notice: Subject to any disclaimer, the term of this patent is extended or adjusted under 35 U.S.C. 154(b) by 155 days.

(21) Appl. No.: 13/032,174

(22) Filed: Feb. 22, 2011

(65) Prior Publication Data

US 2011/0210241 A1    Sep. 1, 2011

Related U.S. Application Data

(60) Provisional application No. 61/308,748, filed on Feb. 26, 2010.

(51) Int. Cl.
*H01J 49/24* (2006.01)
*F16K 11/10* (2006.01)
*F16K 11/00* (2006.01)

(52) U.S. Cl. ........ 250/288; 250/281; 250/282; 137/883; 137/861; 315/108; 315/110

(58) Field of Classification Search .................. 250/281, 250/282, 288; 137/883, 861; 315/110, 108
See application file for complete search history.

(56) References Cited

U.S. PATENT DOCUMENTS

| | | | | |
|---|---|---|---|---|
| 5,065,794 | A | \* | 11/1991 | Cheung .......................... 137/883 |
| 5,703,360 | A | \* | 12/1997 | Fischer et al. ................. 250/288 |
| 6,062,246 | A | \* | 5/2000 | Tanaka et al. .................... 137/12 |
| 6,653,212 | B1 | | 11/2003 | Yamanaka et al. |
| 7,518,103 | B2 | \* | 4/2009 | Amirav .......................... 250/281 |
| 7,621,171 | B2 | \* | 11/2009 | O'Brien ....................... 73/23.41 |
| 2006/0280867 | A1 | | 12/2006 | Park et al. |
| 2011/0253888 | A1 | \* | 10/2011 | Badiei et al. ................... 250/282 |

FOREIGN PATENT DOCUMENTS

WO    2008032108 A1    3/2008

OTHER PUBLICATIONS

Baranov, Vladimir, et al., A Dynamic Reaction Cell for Inductively Coupled Plasma Mass Spectrometry (ICP-DRC-MS), Journal of Analytical Atomic Spectrometry, 1999, pp. 1133-1142, vol. 14.
"Notification of Transmittal of the International Search Report and the Written Opinion of the International Searching Authority, or the Declaration" for PCT/IB2011/000363, Aug. 1, 2011, 11 pages, International Searching Authority/European Patent Office, Patentlaan, The Netherlands.
"Notification Concerning Transmittal of Copy of International Preliminary Report on Patentability (Chapter I of the Patent Cooperation Treaty)" for PCT/IB2011/000363, Sep. 7, 2012, 8 Pages, The International Bureau of WIPO, Geneva, Switzerland.

\* cited by examiner

*Primary Examiner* — Nikita Wells
(74) *Attorney, Agent, or Firm* — Kurt Rauschenbach; Rauschenbach Patent Law Group, LLP

(57) ABSTRACT

A gas delivery system for a cell-based mass spectrometer includes a mass flow controller having an input coupled to a gas source. A three-way valve includes an input coupled to an output of the mass flow controller, a first output coupled to a vacuum system, and a second output normally coupled to a reaction or collision cell. A cell is positioned inside a vacuum chamber of the mass spectrometer where the second output of the three-way valve is coupled to an inlet of the cell and the mass flow controller provides a gas to the cell that increases a pressure inside the cell relative to the pressure in the vacuum chamber.

23 Claims, 2 Drawing Sheets

GAS DELIVERY SYSTEM FOR MASS SPECTROMETER REACTION AND COLLISION CELLS

CROSS-REFERENCE TO RELATED APPLICATIONS

The present application is a non-provisional of U.S. Provisional Patent Application Ser. No. 61/308,748 filed on Feb. 26, 2010. The entire contents U.S. Patent Application Ser. No. 61/308,748 is herein incorporated by reference.

The section headings used herein are for organizational purposes only and should not to be construed as limiting the subject matter described in the present application in any way.

INTRODUCTION

Mass spectrometers are analytical instruments for determining the elemental and molecular composition of various types of samples. In general, a mass spectrometer includes an ion source that ionizes gas phase molecules or transforms ions that exist in solution into the gas phase. A mass analyzer sorts the ions by their mass to charge ratio. Quadrupole mass analyzers are mass-selective filters that use oscillating electrical fields to selectively stabilize or destabilize the paths of ions passing through a radio frequency (RF) quadrupole field. Only a single mass/charge ratio is passed through the system at any time, but changes to the potentials on lenses allow a wide range of mass-to-charge ratio values to be sequentially scanned rapidly, either continuously or in a succession of discrete hops.

Time-of-flight (TOF) mass analyzers utilize an electrostatic accelerator to pass on the same amount of kinetic energy to all the ions with the same charge. The time that the ions take to reach the detector is measured. The mass-to-charge ratio of the ions can be determined from the time it takes the ions to reach the detector. If the particles all have the same charge, their kinetic energies will be identical, and their velocities will depend only on their mass-to-charge ratio. Consequently lighter ions will reach the detector first.

Mass spectrometers also include a detector, which detects ions and thus provides data for calculating the abundances of each ion measured. Mass spectrometry has both qualitative and quantitative uses. These include identifying unknown compounds, determining the isotopic composition of elements in a molecule, and determining the structure of a compound by observing its fragmentation. Other uses include quantifying the amount of a compound in a sample or studying the fundamentals of the chemistry of ions and neutrals in a vacuum. Mass spectrometry is now very commonly used in analytical laboratories that study physical, chemical, or biological properties of a great variety of compounds.

Elemental composition of samples is analyzed using a mass spectrometer (MS) by first exposing the sample to an ionization source to create gas-phase atomic ions that are then analyzed by a mass analyzer. One type of ion source is a high frequency induction coil that encircles a quartz tube at a sample inlet and generates a plasma by the action of the induction coil. A mass spectrometer that uses such an inductive ion source is commonly referred to as an inductively coupled plasma mass spectrometer (ICP-MS). Inductively coupled plasma mass spectrometers may include collision and/or reaction cells that remove interfering ions through collisions or ion/molecule reactions. The collision and/or reaction cells are enclosed multipoles (quadrupole, hexapole, octapole, etc) positioned before or after the traditional mass analyzer (quadrupole, TOF, double focusing, ion mobility, etc) within the vacuum chamber of the mass spectrometer and can be filled with a reaction gas, such as ammonia, methane, oxygen, methyl fluoride, and hydrogen or an inert collision gas, such as helium or neon. The chambers can be filled with one type of gas or can be filled with a mixture of two or more types of gases. Collision gas molecules can collide with interfering ions to eliminate or dampen some of the interferences. Reaction gas molecules can selectively react with the interfering ions to eliminate or dampen some of the interferences.

BRIEF DESCRIPTION OF THE DRAWINGS

The Applicants' teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

DESCRIPTION OF VARIOUS EMBODIMENTS

Figure 1:
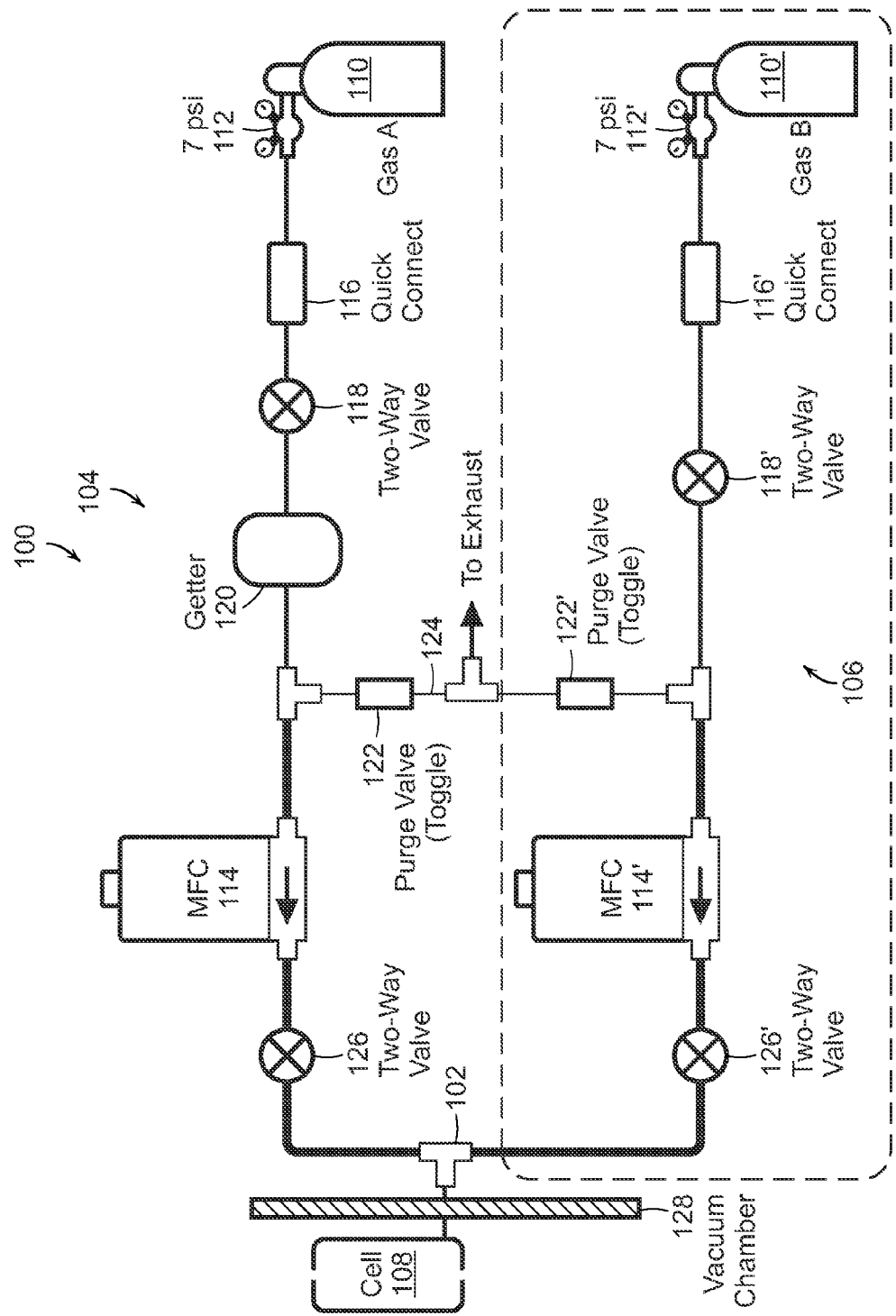
FIG. 1 illustrates a known collision/reaction cell gas delivery system for mass spectrometers.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the Applicants' teaching may be performed in any order and/or simultaneously as long as the teaching remain operable. Furthermore, it should be understood that the apparatus and methods of the Applicants' teaching can include any number or all of the described embodiments as long as the teaching remain operable.

The Applicants' teaching will now be described in more detail with reference to exemplary embodiments thereof as shown in the accompanying drawings. While the Applicants' teaching are described in conjunction with various embodiments and examples, it is not intended that the Applicants' teaching be limited to such embodiments. On the contrary, the Applicants' teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Inductively coupled plasma mass spectrometers with collision/reaction cells have various modes of operation. In the vented-cell mode of operation, the collision/reaction cell is not pressurized with a collision gas or a reactive gas. The ions pass directly through the cell without any enhancement in collision rate or reaction rate compared with other areas of the vacuum chamber and without any additional reactions with gas molecules compared with other areas of the vacuum chamber. In the pressurized-cell mode of operation, the cell is pressurized with either a collision gas or a reaction gas. Ions passing through the cell can either have elastic collisions with the collision gas and lose their energies, or can react with the reaction gas.

In some modes of operation, the inductively coupled plasma mass spectrometers with collision/reaction cells may be required to rapidly change modes of operation between the vented-cell mode of operation and the pressurized-cell mode of operation, or between two pressurized-cell modes using different gases. For example, switching back and forth between the vented-cell mode of operation and the pressurized-cell mode of operation can allow the instrument to measure mass-to-charge ratios of both non-interfered and interfered isotopes.

Rapidly switching modes of operation, however, can present some technical challenges. Collision or reaction gas can be delivered to the collision/reaction cell under high vacuum at relatively low flow rates to avoid overshooting the desired operating pressure. In some instruments, the flow rates are less than 10 mL/min. Such low flow rates can result in a slow fill time of the dead volume of the pneumatic components leading to the cell. Consequently, the time required to pressurize the cell and to stabilize the signal for analysis can often be unacceptably long. These long times required to pressurize the cell and to stabilize the signal can reduce the sample throughput when mixed-mode methods are used and can dramatically affect the operating cost of the mass spectrometric analysis.

FIG. 1 illustrates a known collision/reaction cell gas delivery system 100 for mass spectrometers. The gas delivery system 100 shown in FIG. 1 includes a gas manifold 102 with a first 104 and a second gas channel 106 for delivering a first and a second gas to a collision/reaction cell 108. For example, the first gas can be a reaction gas, such as ammonia, and the second gas can be a collision gas, such as helium. The first and second gases can also be different types of reaction gases or different types of collision gases. One skilled in the art will appreciate that the gas delivery system 100 can include any number of gas channels coupled to the gas manifold 102. In the gas delivery system 100 shown in FIG. 1, the user controls the first and second gas channels 104, 106 to select gases provided by either the first gas channel 104, the second gas channel 106, or both the first and the second gas channels 104, 106 together.

The first gas channel 104 includes a first gas source that is, for example, a reaction gas source, such as ammonia contained in a gas cylinder 110. A regulator 112 is coupled to the outlet of the gas cylinder 110. The regulator 112 controls the output gas supply pressure to a pressure that is suitable for the input of a mass flow controller 114 and for the low pressure gas manifold 102 which provides collision/reaction gas to the collision/reaction cell 108 in a mass spectrometer. For example, the gas pressure at the output of the regulator 112 can be a few pounds per square inch. Some known systems use an output pressure of about 5-50 pounds per square inch.

Many gas supplies include a union fitting 116 that couples the output of the regulator 112 to the rest of the gas channel 104. Such a union fitting 116 allows the user to easily and rapidly change the gas cylinder 110 to provide more gas or to change the type of gas. The output of the union fitting 116 is connected to a two-way shut-off valve 118 that isolates the gas cylinder 110 from the rest of the gas channel 104.

In some gas delivery systems, a gas purifier such as a getter 120 is coupled to the two-way shut-off valve 118 to remove undesirable molecules (e.g., impurities) in the gas. For example, the getter 120 can be used to remove unwanted species in the reaction gas so that there is no competing reaction in the reaction cell 108. In some systems, the getter 120 is used to remove water and/or oxygen from the gas. For example, zirconium oxide can be used as the getter 120. Numerous other types of gas purifiers can also be used.

The mass flow controller 114 is coupled to the getter 120 or to the two-way shut-off valve 118 if the optional getter 120 is not present. The mass flow controller 114 measures and controls the flow of the reaction gas to the collision/reaction cell 108. Mass flow controllers are typically designed and calibrated to control the flow of specific types of gases at particular ranges of flow rates.

A purge valve 122 is coupled between the getter 120 and the mass flow controller 114 to allow the user to purge the gas line from the gas cylinder 110 or to purge from the two-way shut-off valve 118 to the input of the mass flow controller 114. An outlet of the purge valve 122 is coupled to an exhaust system. In the pressurized mode of operation, the purge valve 122 is closed, gas passes unrestricted from the getter 120 to the mass flow controller 114 without being diverted through the purge valve 122 and evacuated. In the purge mode of operation, the purge valve 122 is open and the gas in the gas line is evacuated through the purge line 124 to the exhaust system. In the purge mode of operation, the two-way shut-off valve 118 can be closed and only the gas line between the two-way shut-off valve 118 and the mass flow controller 114 is evacuated through the exhaust system.

The second gas channel 106 includes a second gas source that is, for example, a collision gas source such as helium or another reaction gas such as oxygen, contained in a second gas cylinder 110'. A regulator 112' is coupled to the outlet of the second gas cylinder 110' to control the output gas supply pressure to a pressure that is suitable for an input of a mass flow controller 114' and for the low pressure gas manifold 102 which provides collision gas to the collision/reaction cell 108 in the mass spectrometer. A union fitting 116' couples the output of the regulator 112' to the rest of the gas channel 106. The output of the union fitting 116' is connected to a two-way shut-off valve 118' that isolates the second gas cylinder 110' from the rest of the gas channel 106. The second gas channel 106 shown in FIG. 1 does not include a getter because it is not always necessary to remove undesired molecules from collision gas. However, in some embodiments, a getter is included in both the first and the second gas supplies 104, 106 to remove undesired molecules. A second mass flow controller 114' is coupled to the two-way shut-off valve 118' and is used to measure and control the flow of the reaction gas to the collision/reaction cell 108. A second purge valve 122' is coupled between the second mass flow controller 114' and the two-way shut-off valve 118' to allow the user to purge the gas line from the second gas cylinder 110' or from the two-way shut-off valve 118' to the input of the mass flow controller 114'. An outlet of the purge valve 122' is coupled to the exhaust system.

When the purge valve 122' is closed, gas passes unrestricted from the two-way shut-off valve 118' to the second mass flow controller 114' without being diverted through the purge valve 122'. In a purge mode of operation, the purge valve 122' is open and gas in the gas line is evacuated through a purge line 124' to the exhaust system. In the purge mode of operation, the two-way shut-off valve 118' can be closed and only the gas line between the two-way shut-off valve 118' and the mass flow controller 114' is evacuated through the exhaust system.

Mass flow controllers often experience some leakage of gas through their output port when they are configured in the closed output position. Manufacturers of mass flow controllers often recommend installing a positive two-way shut-off valve downstream of the output of the mass flow controller to ensure that there is no leakage of gas into the downstream high vacuum system. Therefore, second two-way shut-off valves 126, 126' are typically coupled between the output of each of the first 114 and second mass flow controller 114' and the input of the gas manifold 102. These two-way shut-off valves 126, 126' need to positively shut-off all gas flow to the manifold 102 to prevent leakage into the vacuum chamber 108. The output of the manifold 102 is coupled through the vacuum chamber wall 128 and into the collision/reaction cell 108. The collision or reaction gas flows into the cell 108 until the desired gas pressure is achieved.

In this known configuration of a collision/reaction cell gas delivery system 100 for mass spectrometers, there is an undesirable gas build up between the mass flow controllers 114, 114' and the second two-way shut-off valves 126, 126'. This undesirable gas build up results in an undesirably large flow of gas into the collision/reaction cell 108 when the second two-way shut-off valves 126, 126' are opened to perform a measurement. The large flow of gas into the collision/reaction cell 108 is sometimes referred to as gas flow over-shoot. The effect of this gas flow over-shoot is to increase the time required to stabilize the analytical signal. Many cell-based mass spectrometer instruments use smaller than optimal cell sizes to minimize the gas flow over-shoot.

The methods and apparatus of the present teaching relate to reducing or eliminating the gas flow over-shoot in collision/reaction cells 108 of mass spectrometers when the second two-way shut-off valves 126, 126' are opened. One aspect of the gas delivery systems for collision/reaction cells of mass spectrometers according to the Applicants' teaching is the use of three-way valves or similar devices and/or vacuum system configurations to purge the gas line between the output of the mass flow controllers 126, 126' and the gas manifold 102. In one embodiment, a three-way valve is positioned between the outputs of the mass flow controllers 114, 114' and the inputs of the gas manifold 102.

Figure 2:
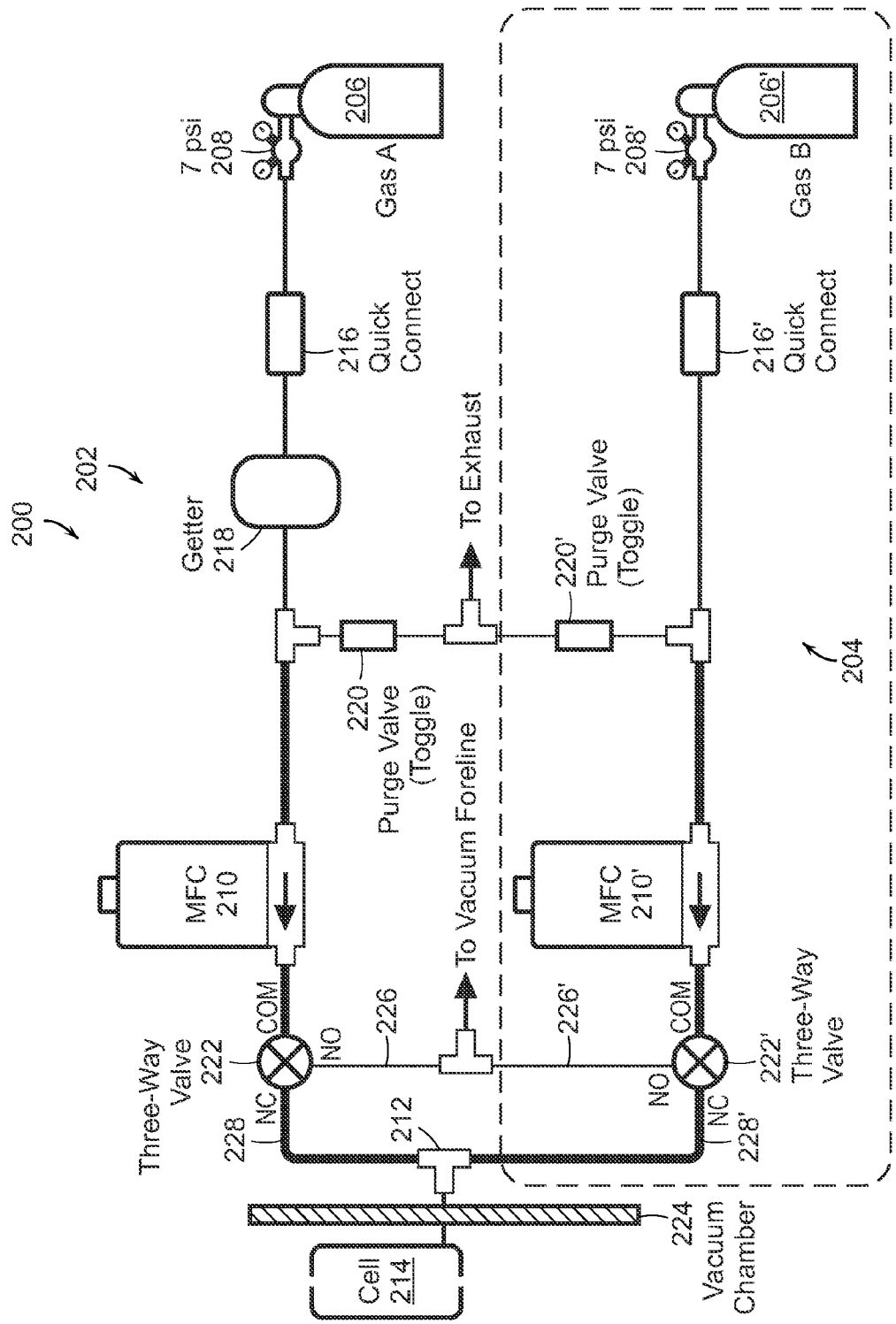
FIG. 2 illustrates a collision/reaction cell gas delivery system for mass spectrometers according to the Applicants' teaching.

FIG. 2 illustrates a collision/reaction cell gas delivery system 200 for mass spectrometers according to the Applicants' teaching. The gas delivery system 200 is similar to the gas delivery system 100 that was described in connection with FIG. 1. The gas delivery system 200 includes a first 202 and second gas channel 204 that includes a first and second gas source. For example, for purposes of illustrating the Applicants' teaching, the first gas source can be a gas cylinder 206 containing a reaction gas, such as ammonia, and the second gas source can be a second gas cylinder 206' containing a collision gas, such as helium.

In some embodiments, the gas delivery system includes a gas manifold (not shown) in at least one of the first and second gas sources. In these embodiments, at least two gas cylinders are coupled to the gas manifold. For example, the first gas source can include a gas manifold that is coupled to at least one collision gas and to at least one reaction gas or can include a gas manifold that is coupled to at least two different reaction gases. It will be appreciated by a person skilled in the art that a similar design can be used for a single reaction or collision gas. In addition, manifolds with more than two gas channels can be designed using the concepts that are described in this teaching.

A first regulator 208 is coupled to the outlet of the first gas cylinder 206 and a second regulator 208' is coupled to the outlet of the second gas cylinder 206'. The regulators 208, 208' control the output gas supply pressure to a pressure that is suitable for the input of mass flow controllers 210, 210' and for a low pressure gas manifold 212 which provides collision and reaction gas to a collision/reaction cell 214 in the mass spectrometer. A first union fitting 216 couples the output of the first regulator 208 to the first gas channel 202 and a second union fitting 216' couples the output of the second regulator 208' to the second gas channel 204. The output of the first union fitting 216 is coupled to a getter 218 that removes undesirable molecules (e.g., impurities) as described in connection with FIG. 1. The second gas channel 204 does not include a getter because it provides a collision gas and it is not always necessary to remove undesired molecules from collision gas. However, in some embodiments, a getter is included in both the first and the second gas supplies 202, 204 to remove undesired molecules.

The getter 218 is coupled to the first mass flow controller 210. A first purge valve 220 is coupled between the getter 218 and the first mass flow controller 210. The first purge valve 220 allows the user to purge the gas line from the first gas cylinder 206 to the input of the first mass flow controller 210. The second union fitting 216' is coupled to a second mass flow controller 210'. A second purge valve 220' is coupled between the second union fitting 216' and the second mass flow controller 210'. The second purge valve 220' allows the user to purge the gas line from the second gas cylinder 206' to the input of the second mass flow controller 210'. An outlet of the purge valves 220, 220' is coupled to the exhaust system.

The output of the first mass flow controller 210 is coupled to an input of the first three-way valve 222. A first output of the first three-way valve 222 is coupled to a vacuum system, such as a vacuum pumping system. For example, the first output of the first three-way valve 222 can be coupled to a roughing pump or a turbomolecular vacuum pump that is used to evacuate the mass spectrometer vacuum chamber with the cell 214. The required pressure can, for example, fall in the range between 1 microTorr up to a few Torr and can be higher or lower depending upon the specific design of the mass spectrometer instrument and the internal leak rate (i.e., through leak) of the three-way valve 222. The second output of the first three-way valve 222 can be coupled to an inlet of the cell or to a connector, such as the first input of the gas manifold 212.

Similarly, the output of the second mass flow controller 210' is coupled to an input of the second three-way valve 222'. A first output of the second three-way valve 222' is coupled to the vacuum system. The second output of second three-way valve 222' can be coupled to an inlet of the cell or to a connector, such as the second input of the gas manifold 212. The output of the manifold 212 is coupled through the vacuum chamber wall 224 and into the collision/reaction cell 214. One advantage of the gas delivery system of the Applicants' teaching can be to decrease the pressure difference across the three-way valves 222, 222' which significantly relaxes the internal leakage requirements of the three-way valves 222, 222' as compared to the two-way valves 126, 126' described in connection with FIG. 1. This decrease in the pressure difference can allow the use of less expensive three-way valves.

In many cell-based mass spectrometer instruments according to the Applicants' teaching, the cell 214 is a dual-use cell. Mass analysis can be performed in the vented mode of operation where the cell 214 is not pressurized and ions pass through the cell 214 and experience the same pressure as ions in other areas in the vacuum chamber. Mass analysis can also be performed in the pressurized mode of operation where collision or reaction gas can pressurize the cell 214 and ions can experience an increased pressure of collision or reaction gas as they pass through the cell.

In the vented mode of operation, any gas from the output of the mass flow controllers 210, 210' is directed to the vacuum system. In this mode of operation, the first output of the first and second three-way valves 222, 222' are open so that any gas that can be present in the line between the mass flow controllers 210, 210' and the three-way valves 222, 222', and the gas that leaks from the output of the first and second mass flow controllers 210, 210', when the first and second mass flow controllers 210, 210' are configured in the closed position, is evacuated through the gas lines 226, 226' coupled to the vacuum system. The second output of the first and second three-way valves 222, 222' is closed so that no gas flows to the manifold 212. In one embodiment of the Applicants' teaching, the first output of the first and second three-way valves 222, 222' are normally in the vented mode of operation when they are not energized by the user.

In the pressurized mode of operation, gas from the output of the mass flow controller 210 or 210' (or both) is directed to respective inputs of the gas manifold 212. In this mode of operation, the second output of the first or second (or both) three-way valves 222, 222' are open to allow gas to flow from the mass flow controllers 210 or 210' (or both) to the inputs of the manifold 212. In one embodiment of the Applicants' teaching, the second output of the first and second three-way valves 222, 222' are normally closed in the vented mode of operation when they are not energized and are open when they are energized by the user so that gas flows to the input of the manifold 212 only when the user instructs the mass spectrometer to take measurements. The collision or reaction gas flows into the cell 214 in the vacuum chamber until the desired gas pressure is reached, which in some mass spectrometer instruments is in the range of a few millitorr to tens of millitorr. The gas flow can remain constant during the analysis or can be changed by the user to analyze various ions. If a collision gas, such as helium is used, the collision gas molecules can collide with certain ions thereby lowering the energy of these ions. An energy barrier can be positioned at the exit of the cell 214 to prevent the transmission of unwanted ions whose energies are lowered by the collision gas. If a reaction gas, such as ammonia is used, the reactive gas molecules can selectively react with some ions to remove and neutralize the ions.

One advantage of the collision/reaction cell gas delivery system for mass spectrometers according to the Applicants' teaching can be that the internal volume of collision and reaction gases in the gas lines downstream of the mass flow controllers 210, 210' can be greatly reduced. The greatly reduced volume of collision and reaction gases in these gas lines can significantly improve the fill time of the collision/reaction cell 214 at relatively low flow rates, which are typically less than 10 mL/min. Therefore, the collision/reaction cell gas delivery system for mass spectrometers according to the Applicants' teaching can be particularly useful for applications where fast venting/pressurizing is critical to switch from one mode of operation to another mode of operation.

When switching from the vented mode of operation to the pressurized mode of operation, there is a delay until the pressure inside the cell reaches the desired level. During the pressure rise, the analytical signal is not stable and meaningful data cannot be acquired. Some instruments wait until the short term precision of the signal is better than 3% in terms of relative standard deviation (RSD).

For example, the gas delivery system of the Applicants' teaching can shorten the switching time from the vented mode of operation to the pressurized mode of operation where the desired collision or reaction gas enters into the cell 214 and achieves the desired pressure for performing measurements using collisions or reactions in the cell. In addition, the gas delivery system of the present teaching can shorten the switching time from the pressurized mode of operation to the vented mode of operation where the desired collision or reaction gas is evacuated from the cell 214 to the vacuum pumping system. These switching times can be reduced from several minutes to 10 seconds or less using the gas delivery system of the Applicants' teaching.

In comparison to some commercial cell-based mass spectrometers, the switching times using the gas delivery system of the Applicants' teaching can be in the range of six to ten times faster. The relatively fast switching times can be achieved at least in part because there are no bursts of collision or reactive gas when the two-way shut-off valves 126, 126' (FIG. 1) between the mass flow controllers 114, 114' and the input to the gas manifold 102 are opened. In practice, the relatively fast switching times can result in a cell-based mass spectrometer instrument with relatively fast data availability, higher sample throughput, and reduced cost of analysis.

The inside diameter of the gas lines 228, 228' between the mass flow controllers 210, 210' and the inputs of the gas manifold 212 can be an important parameter in the gas delivery system according to the Applicants' teaching. If the inside diameter of these gas lines 228, 228' is too large, there will be too large of a dead volume for the collision or reaction gas to fill and, consequently it will take an unacceptably long time to fill and vent the cell 214. Also, if the inside diameter of these gas lines 228, 228' is too small, the gas conductance will be too low and the switching times will be unacceptably long. It has been discovered that the gas lines 228, 228' between the mass flow controllers 210, 210' and the inputs of the gas manifold 212 can be sized with an inside diameter that has a relatively small dead volume, but still has enough gas flow conductance to quickly purge the gas lines and fill the cell with a flow rate that quickly achieves steady state operation of the mass spectrometer. The particular inside diameter of the gas lines 228, 228' that can achieve these goals simultaneously depends upon the physical dimensions of the mass spectrometer instrument, such as the length of the gas lines 228, 228' and the type and flow rate of the collision and reaction gases through the gas lines 228, 228'. In one particular mass spectrometer instrument that embodies the teaching, this inside diameter of the gas lines 228, 228' can be in the range of 30-80 thousands of an inch.

Equivalents

While the Applicants' teaching are described in conjunction with various embodiments, it is not intended that the Applicants' teaching be limited to such embodiments. On the contrary, the Applicants' teaching encompass various alternatives, modifications, and equivalents, as will be appreciated by those of skill in the art, which may be made therein without departing from the spirit and scope of the teaching.

What is claimed is:

1. A gas delivery system for a cell-based mass spectrometer, the gas delivery system comprising:
   a) a mass flow controller having an input coupled to a gas source;
   b) a three-way valve having an input coupled to an output of the mass flow controller, a first output coupled to a vacuum system, and a second output; and
   c) a cell positioned inside a vacuum chamber of a mass spectrometer, the second output of the three-way valve being coupled to an inlet of the cell, the mass flow controller providing a gas to the cell that increases a pressure inside the cell relative to the pressure in the vacuum chamber.

2. The gas delivery system of claim 1 wherein the gas comprises a collision gas.

3. The gas delivery system of claim 1 wherein the gas comprises a reaction gas.

4. The gas delivery system of claim 1 wherein the first output of the three-way valve is normally open and the second output of the three-way valve is normally closed.

5. The gas delivery system of claim 1 wherein the three-way valve is electrically controlled and a signal to the three-way valve opens the second output of the three-way valve to provide gas to the cell.

6. The gas delivery system of claim 1 wherein the gas source comprises a gas manifold coupled to a plurality of gas cylinders.

7. The gas delivery system of claim 1 further comprising a purge valve positioned between the gas source and the input to the mass flow controller, an output of the purge valve being coupled to an inlet of an exhaust line.

8. The gas delivery system of claim 1 wherein a gas line from the output of the mass flow controller to the input of the cell has an inside diameter that provides enough gas flow conductance to purge the gas lines and fill the cell with a flow rate that achieves steady state operation of the mass spectrometer within 10 seconds.

9. A gas delivery system for a cell-based mass spectrometer, the gas delivery system comprising:
    a) a plurality of mass flow controllers, each of the plurality of mass flow controllers having an input coupled to an output of a respective one of a plurality of gas sources;
    b) a plurality of three-way valves, each of the plurality of three-way valves having an input that is coupled to an output of a respective one of the plurality of mass flow controllers, a first output of each of the plurality of three-way valves being coupled to a vacuum system; and
    c) a cell positioned inside a vacuum chamber of a mass spectrometer, a second output of each of the plurality of three-way valves being coupled to an inlet of the cell, at least one of the plurality of mass flow controllers providing a gas to the cell that increases a pressure inside the cell relative to the pressure in the vacuum chamber.

10. The gas delivery system of claim 9 wherein the gas comprises a collision gas.

11. The gas delivery system of claim 9 wherein the gas comprises a reaction gas.

12. The gas delivery system of claim 9 wherein the first output of the plurality of three-way valves is normally open and the second output of the plurality of three-way valves is normally closed.

13. The gas delivery system of claim 9 wherein the plurality of three-way valves is electrically controlled and a signal applied to each of the plurality of three-way valves opens the second output to provide gas to the cell.

14. The gas delivery system of claim 9 further comprising at least one purge valve positioned between the plurality of gas sources and the inputs of the plurality of mass flow controllers, an output of the at least one purge valve being coupled to an exhaust system.

15. The gas delivery system of claim 9 wherein a gas line from the output of at least one of the plurality of mass flow controllers to the cell has an inside diameter that provides enough gas flow conductance to purge the gas lines and fill the cell with a flow rate that achieves steady state operation of the mass spectrometer within 10 seconds.

16. A method for delivering gas to a cell-based mass spectrometer, the method comprising:
    a) providing a gas to a mass flow controller; b) providing a three-way valve having an input that is coupled to an output of the mass flow controller;
    c) evacuating the gas from the output of the mass flow controller; and
    d) metering the gas with the mass flow controller and directing the metered gas to a cell inside a mass spectrometer the mass flow controller providing a gas to the cell that increases a pressure inside the cell.

17. The method of claim 16 wherein the gas comprises a reaction gas.

18. The method of claim 16 wherein the gas comprises a collision gas.

19. The method of claim 17 wherein the reaction gas comprises at least one of ammonia, methane, oxygen, methyl fluoride, and hydrogen.

20. The method of claim 18 wherein the collision gas comprises at least one of helium and neon.

21. The method of claim 16 further comprising providing a gas conductance from the output of the mass flow controller to the cell that achieves relatively low switching times between a vented-cell mode and pressurized mode of operation.

22. The method of claim 21 wherein the gas conductance achieves a low dead volume between the output of the mass flow controller and the cell.

23. The method of claim 21 wherein the gas conductance is sufficient to fill the cell with a flow rate that achieves steady state operation of the mass spectrometer within 10 seconds.

* * * * *